Figure 1:
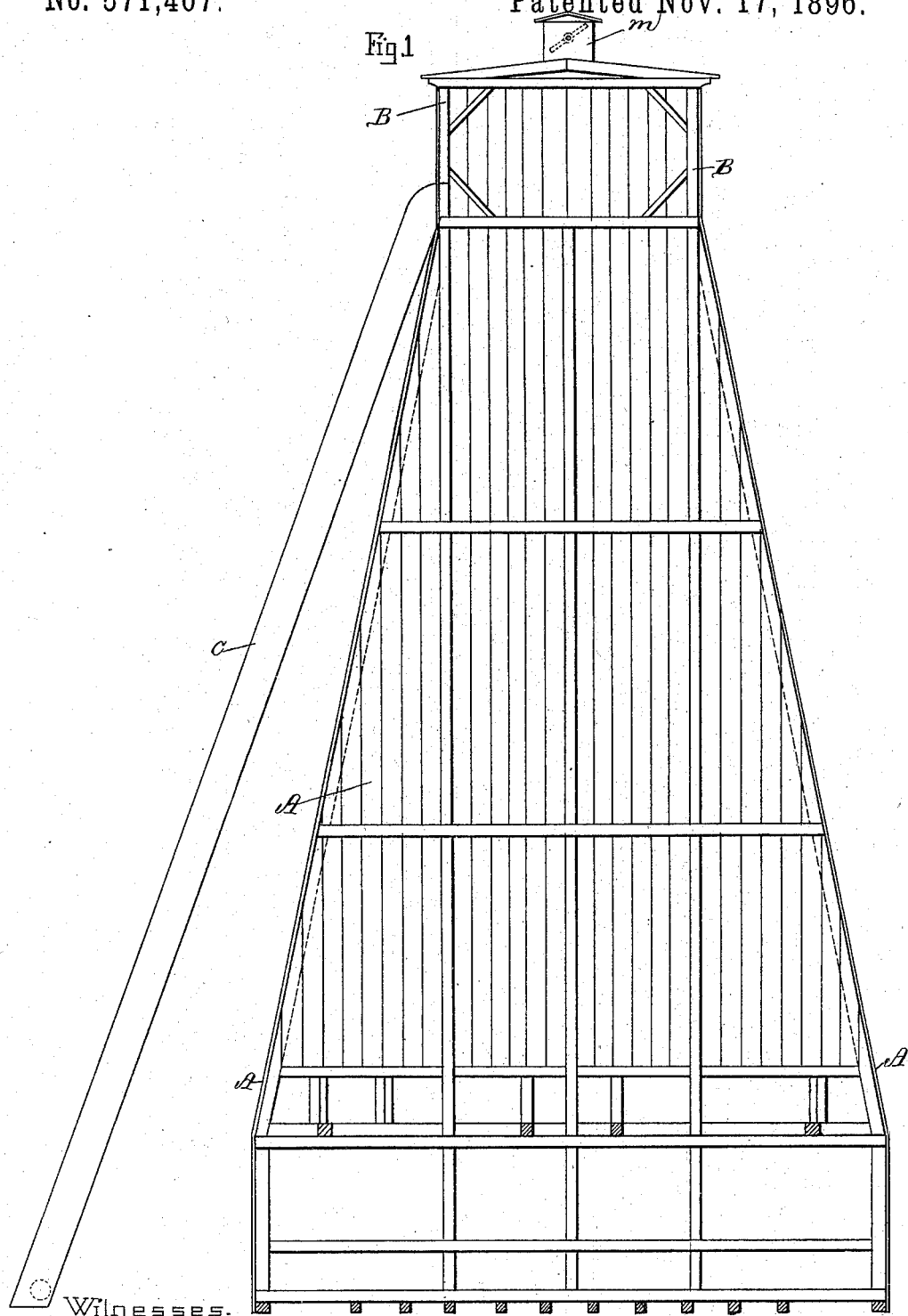

(No Model.) 7 Sheets—Sheet 1.

O. H. SMITH.
KILN FOR DRYING KINDLING WOOD.

No. 571,407. Patented Nov. 17, 1896.

Witnesses.
Lauritz N. Möller.
Henry R. Page.

Inventor.
Otis H. Smith
by W. A. Copeland, his atty (No Model.) 7 Sheets—Sheet 2.

O. H. SMITH.
KILN FOR DRYING KINDLING WOOD.

No. 571,407. Patented Nov. 17, 1896.

Witnesses.
Lauritz N. Möller
Henry D. Page

Inventor.
Otis H. Smith
by H. A. Copeland
his atty.

(No Model.) 7 Sheets—Sheet 3.
O. H. SMITH.
KILN FOR DRYING KINDLING WOOD.

No. 571,407. Patented Nov. 17, 1896.

Witnesses.
Lauritz N. Möller
Henry R. Page

Inventor.
Otis H. Smith
by W. A. Copeland
his atty.

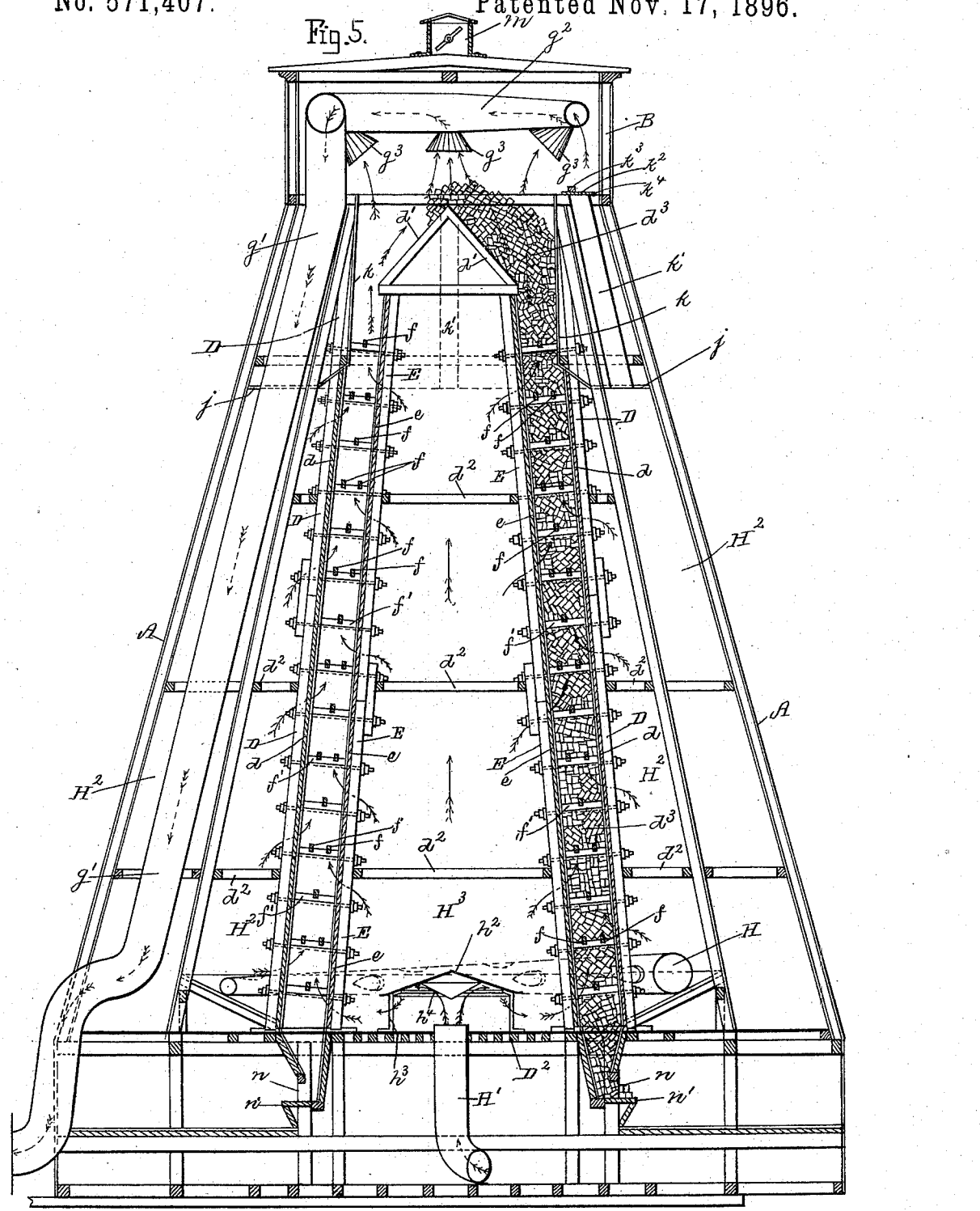

(No Model.) 7 Sheets—Sheet 5.

O. H. SMITH.
KILN FOR DRYING KINDLING WOOD.

No. 571,407. Patented Nov. 17, 1896.

Witnesses. Inventor.

(No Model.) 7 Sheets—Sheet 6.
O. H. SMITH.
KILN FOR DRYING KINDLING WOOD.
No. 571,407. Patented Nov. 17, 1896.
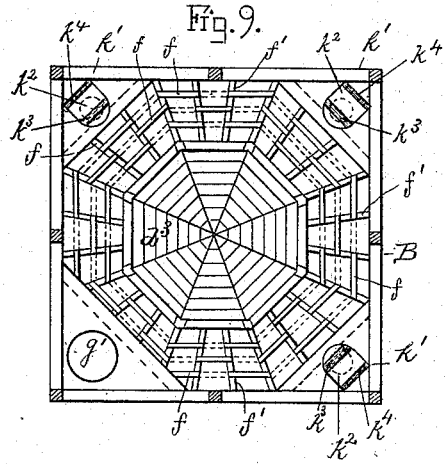
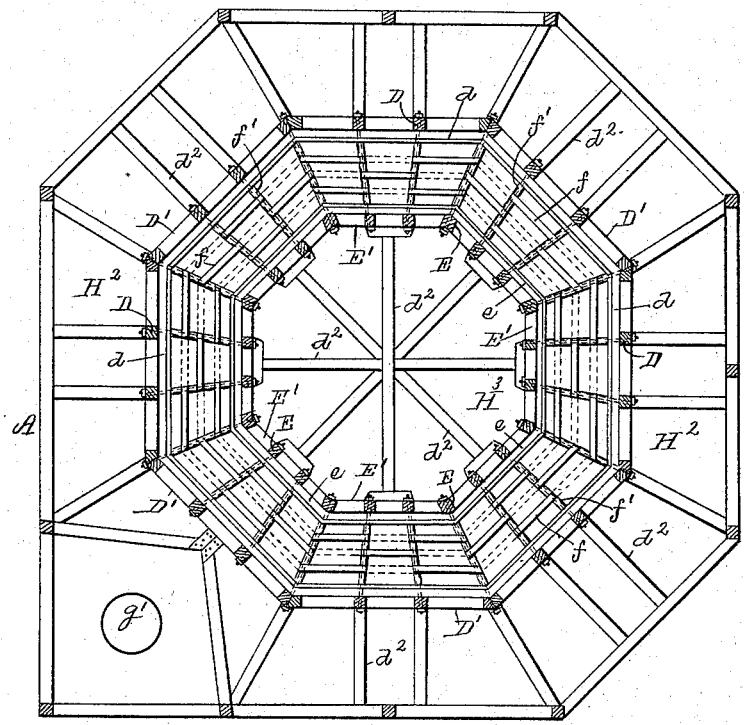
Witnesses.
Lauritz N. Möller
Henry R. Papr
Inventor.
Otis H. Smith
by W. A. Copeland
his atty.

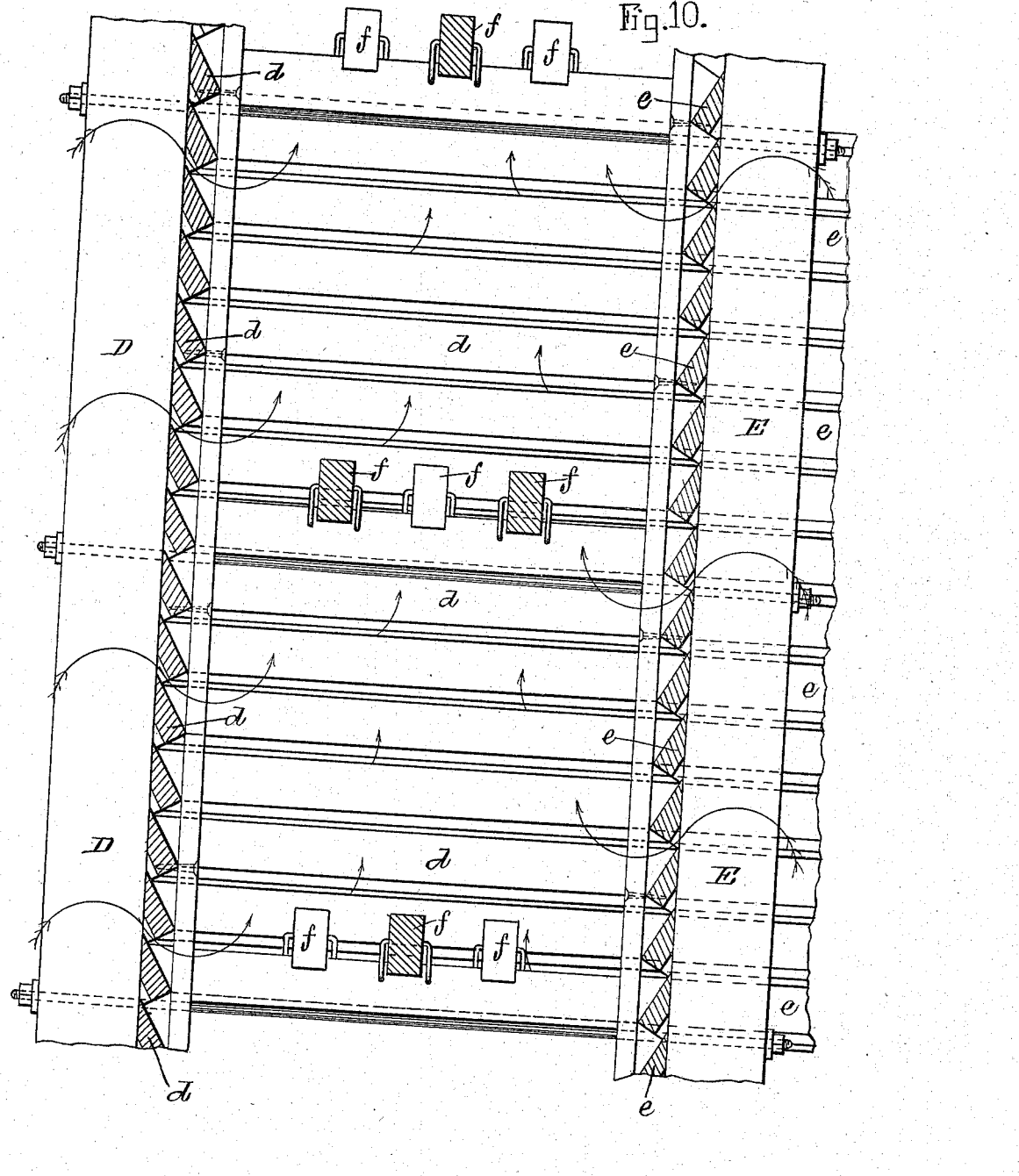

UNITED STATES PATENT OFFICE.

OTIS H. SMITH, OF CAMBRIDGE, MASSACHUSETTS.

KILN FOR DRYING KINDLING-WOOD.

SPECIFICATION forming part of Letters Patent No. 571,407, dated November 17, 1896.

Application filed March 25, 1896. Serial No. 584,775. (No model.)

*To all whom it may concern:*

Be it known that I, OTIS H. SMITH, a citizen of the United States, residing at Cambridge, in the county of Middlesex and Commonwealth of Massachusetts, have invented certain new and useful Improvements in Drying-Kilns for Drying Kindling-Wood, of which the following is a specification, reference being had to the accompanying drawings.

The objects of my invention are to make a drier into which the wood for the kindlings can be taken green direct from the log or tree and after a few days will be sufficiently dried for immediate use; to provide for uniform distribution of the heat and to prevent the wood from channeling or lodging in its passage through the drier; to so construct the kiln that whether the wood be introduced at a single opening or at more than one opening it will be distributed evenly on all sides of the crib; also to so dispose the heating apparatus as to keep it entirely free from contact with the wood and thereby reduce the liability of destruction by fire, and to provide means by which live steam can be speedily introduced into the drying-chambers in case of fire.

I effect the drying by hot air raised to a high degree of temperature, either by steam or otherwise, the hot air being forced by pressure through the mass of wood to be dried, said wood being contained in a crib either hopper, polygonal, or circular in shape, with sufficient height to admit of the wood being under heat from four to six days in the course of its passage, as there are from sixteen hundred to eighteen hundred pounds of wet in each cord of green or wet wood which must be converted into vapor and forced out from the mass of wood before it is fit for kindling. The wood is put into the top by conveyers or otherwise and is dried during its passage down the crib and is taken out of pockets provided for the purpose at the bottom of the crib. I break up the solid mass of wood in its descent through the crib by means of cross-timbers, thereby enabling the hot air to be forced through more evenly and freely. A trouble often met with in kindling-driers is the channeling of the wood, that is, the wood in the middle descends more rapidly than that on the sides. I guard against this by making the crib flare outward, and thus of increasing area as it approaches the bottom. The flare may or may not extend the full height, as desired.

When steam is used for heating, one great danger of fire arises from the collection of fine dust upon the steam-pipes, even when the steam-pipes are separated from the mass of the wood by lattice or other open work which prevents the larger pieces or blocks of wood from coming in contact with the pipes. There is a great deal of fine dust constantly floating about in the crib, which easily passes through any small apertures and accumulates upon the steam-pipes. When this dust becomes dry and highly heated on the pipes, it readily ignites, sometimes explosively, and great damage results, and the plant is exposed to danger of destruction by fire.

I place the heating apparatus entirely outside the kiln, inclosed in a steel case, from which the hot air is conducted to the crib, the air-chambers of the crib itself being sheathed with metal or otherwise, so that no dust can escape and gather on the heater. I also have steam-pipes leading into the hot-air pipes, controlled by a single valve, which is ordinarily closed to shut out the steam, but which can be opened in case of fire, so as to permit the entire crib and hot-air chambers to be quickly filled with live steam to quench the fire. The risk from fire is thus so reduced that more favorable rates can be made with insurance companies, and the plant may be located in connection with mills producing the wood, thereby effecting great economy in handling. The kiln is compact in shape at the bottom, which enables the putting of many presses into a comparatively small space.

Figure 2:
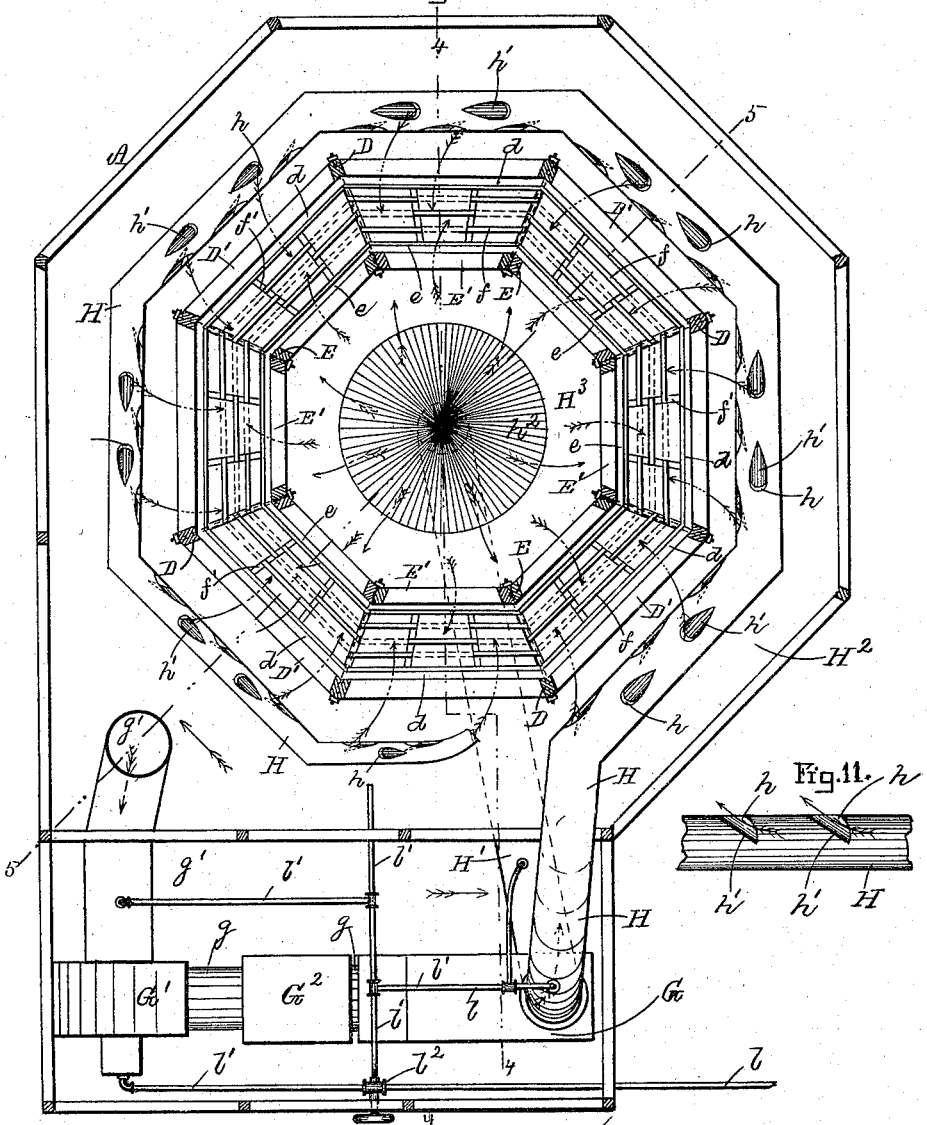
Figure 3:
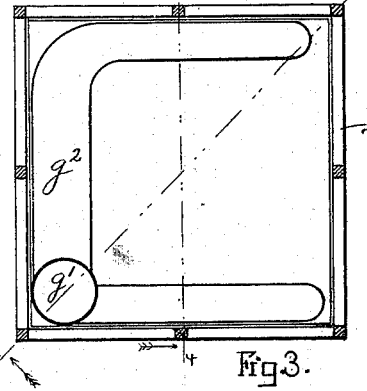
Figure 4:
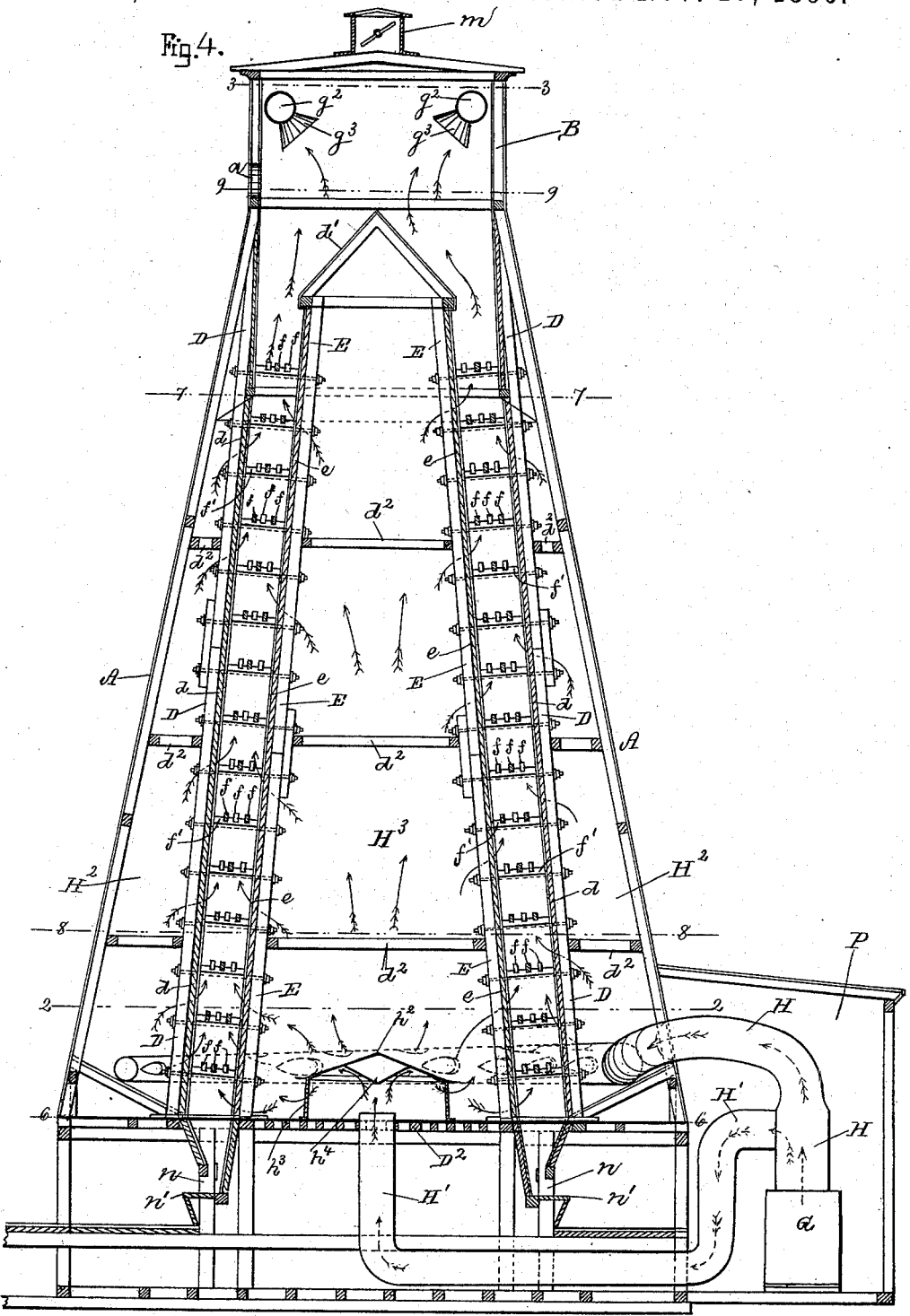

In the drawings, Figure 1 is an elevation showing the exterior framing of the building. Fig. 2 is a sectional plan view on line 2 2 of Fig. 4, showing the bases of the crib and the hot-air chambers, the top of the heater and hot-air pipes, and the location of the fan and the condenser. Fig. 3 is a sectional plan view on line 3 3 of Fig. 4, showing the return air-pipes in the top of the tower. Fig. 4 is a vertical section on line 4 4 of Fig. 2, showing a section of the building and crib and entrances of the hot-air pipes into the hot-air chambers.

Figure 7:
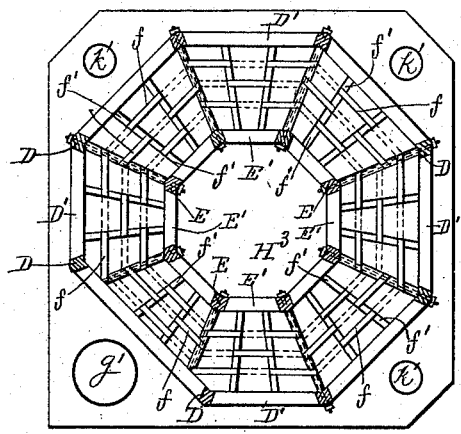
Figure 6:
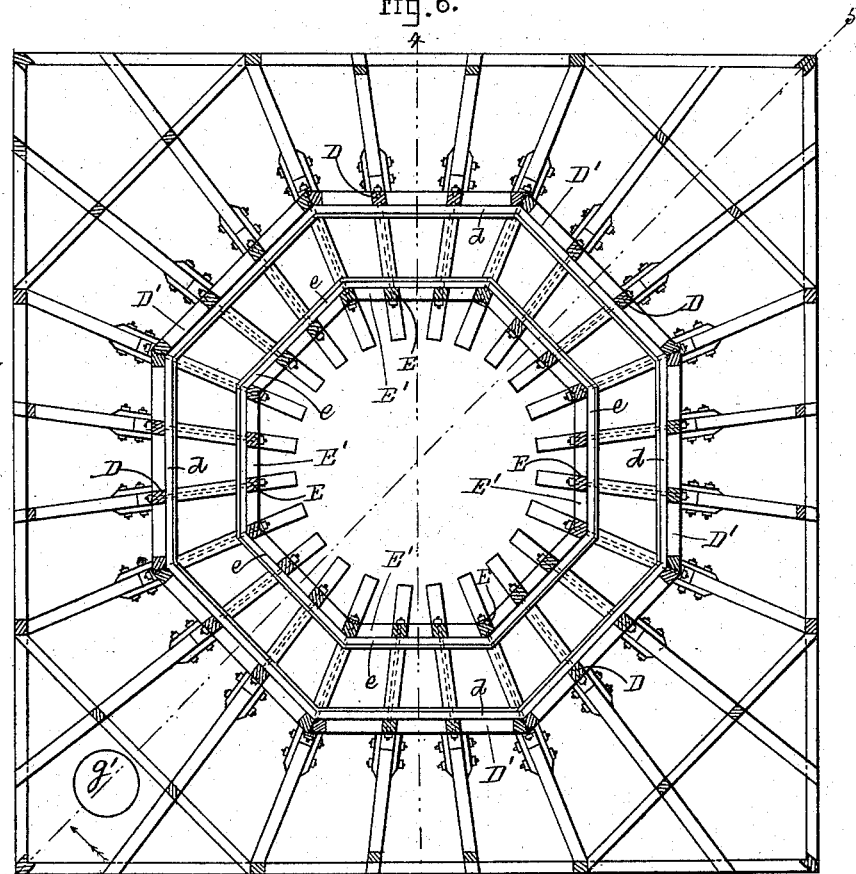

Fig. 5 is a vertical diagonal section of the building and crib on line 5 5 of Fig. 2, showing one of the ventilating-pipes from the outside hot-air chamber to the tower and the return-pipe leading to the blower. The kindlings are shown on one side only, merely for illustration, and are omitted from the other side to show more clearly the cross-timbers. In practice the kindlings will fill all sides equally. Fig. 6 is a sectional plan on line 6 6 of Fig. 4, showing the framework of the base of the crib. Fig. 7 is a sectional plan on line 7 7 of Fig. 4, taken at the top of the outside hot-air chamber and the bottom of the ventilating-pipes leading from the outside hot-air chamber to the tower. Fig. 8 is a sectional plan on line 8 8 of Fig. 4, showing the bracing-timbers and also the timbers in the crib which break up the mass of the wood on its descent. Fig. 9 is a sectional plan on line 9 9 of Fig. 4, showing the top of the cone over the interior hot-air chamber. Fig. 10 is a section of the crib on a larger scale, showing the latticed sides and the cross-timbers in the crib. Fig. 11 is a short section of the hot-air pipe, showing the openings for the passage of hot air into the hot-air chambers and showing the deflectors.

A represents the outside frame of the building, which preferably is made polygonal in cross-section and slanting outward from the base of the tower B to the bottom of the crib, although the shape is not so essential to the outside frame as to the crib, it being in the former case more a matter of convenience and compactness of construction.

C represents a conveyer of any kind for carrying the wood to the entrance $a$ at the upper part of the kiln.

The crib which contains the wood during the process of drying is formed of two frames or cages, one surrounding the other, and both being within the outside framing or main building A. The crib consists of the space between the outer cage and the inner cage, both of which have latticework sides to allow circulation of the hot-air, as will be more particularly described, the space between the outer cage and the wall of the main building A being referred to herein as the "outside" hot-air chamber, and the space inside of the inner cage being referred to as the "inside" hot-air chamber. The walls of the crib are represented in the drawings as octagonal in cross-section and I consider it very desirable that the form shall be polygonal or circular, the polygonal form being cheaper of construction than the circular. The walls slant outward from the top or near the top toward the bottom, forming a hollow frustum of a cone with a conical cap on top of the inside walls. The parts marked D are the standard framing-timbers of the outside walls of the crib, and the parts marked E are the standard framing-timbers of the inside walls of the crib. The walls or sides of the crib are of latticework, $d$ being the outside walls and $e$ the inside walls.

The latticework is shown plainly by the enlarged sectional view, Fig. 10. The walls slant outward except perhaps for a short distance at the top, and are parallel with each other, so that although the distance between the walls is the same the perimeter increases toward the bottom and therefore the sectional area increases and prevents any tendency of the wood to channel. The crib has a series of breaking-up timbers $f$ extending horizontally around the crib for the purpose of breaking up the mass of wood in its descent, so that it may not become too compact to allow free circulation of the hot air. These breaking-up timbers $f$ are secured to the cross-timbers $f'$ and are shown as occurring at different stories or levels in the height of the crib and as consisting of three broken rows on each level. Each bin of the crib, that is, each one of the eight compartments corresponding to the eight different sides, is represented as divided by its cross-timbers $f'$ into three sections, and the breaking-up timbers $f$ extend from one of these cross-timbers $f'$ to the next in alternate sections, and the different lines break also alternately with each other, so that on the same level one section contains one cross-timber, the next one contains two, the next contains one, and so on. On the level next above, the breaks occur alternately with those on the first level. This will be clearly seen by reference to the drawings. The alternate breaking-up timbers on the same level in next section beyond are shown in Figs. 4 and 10 by full lines, but are omitted from Fig. 5. Of course the exact number of these breaking-up timbers is not essential, but they should be alternately arranged, so that the mass of wood shall be thoroughly broken. As the building represented in the drawings is about one hundred feet in height, these cross-timbers will be several feet apart, so that they are not sufficiently near together to clog the passage of the wood.

The wood $d^3$ is delivered from the conveyer into the tower B at the entrance $a$ and falls upon the top of the conical cap $d'$, which spreads the wood in all directions, so that it will be evenly distributed on all sides of the crib. The wood $d^3$ is shown only in the right-hand part of the crib in Fig. 5, it being omitted from the left-hand side for purpose of more clearly showing the breaking-up cross-timbers $f$, as already explained; but when in use the wood will fill all sides equally, so that the single entrance is sufficient. The cross-timbers $d^2$ are braces for the crib and building.

The heat is generated within the steel case G by any form of heating arrangement.

P is a shed over the heat-generator.

$G'$ is a blower or fan, of any of the well-known forms, and $G^2$ a condenser. A pipe $g$ leads from the fan to the condenser and from the condenser to the heat-generator. The air is received at the fan either from the outside or from the return-pipe $g'$, and is forced by the fan through the condenser, which takes out of it any dampness it may contain. The condenser is a box containing iron pipes through which cold water is kept constantly running. The moisture in the air is condensed and is precipitated into a pan in the bottom of the box, whence it is conducted away by a pipe.

The details of the fan and of the condenser are not shown, as they are not claimed as a part of this invention.

From the condenser the air is forced into the heating-chamber or heat-generator G and thence into the hot-air pipe H, which surrounds the outside of the crib within the outside hot-air chamber $H^2$, and has a branch $H'$ opening up through the base of the crib into the inside hot-air chamber $H^3$. On the top and side of the hot-air pipe H there are numerous outlet-openings $h$, through which the hot air escapes into the chamber $H^2$. The deflectors $h'$ facilitate the escape of the hot air. (See Figs. 2 and 11.) These deflectors are best made by cutting a slit in the pipe and striking them down. The pipe H is made tapering, thereby restricting the passage of the hot air, so that it will more freely escape through the openings $h$, the surplus passing out of the tapered open end. The branch $H'$ leads up through the base $D^2$ and opens into the interior hot-air chamber $H^3$. Above the mouth of the pipe H there is a bonnet $h^2$, supported on rods $h^3$ and having on its under side a deflector $h^4$, which deflects the currents of hot air and causes them in part to enter the sides of the crib near the bottom through the open latticework and in part to rise, heating the entire interior, and pass through the open sides, mingling with the other currents of hot air rising through the mass of wood. The bonnet and deflector are preferably made of metal, such as tin, or are tin-lined. The walls, floor, and ceiling of the hot-air chambers, except the walls of the crib, are lined with tin put on in the usual manner to prevent absorption and loss of heat. The walls of the crib both exterior and interior are of latticework, except the upper portion of the exterior wall.

Surrounding the crib near its upper end, just above the section-line 7 7 of Fig. 4, there is a ceiling $j$ of the outside hot-air chamber, and above this ceiling the exterior wall of the crib has a tight lining $k$. From the outside hot-air chamber the hot air is forced between the lattices into the crib and mass of wood and upward, escaping at the top of the crib into the tower and passing out of the ventilator $m$ or returned through pipes $g^2$ $g'$ to be used again. Within the tower there is a horizontally-disposed bent pipe $g^2$, having on its under side inlet-openings within which are inserted bell-mouthed receivers $g^3$, which serve to conduct the moisture-laden air into the pipe. Thence the air is taken down through the return-pipe $g'$ to the fan $G'$, which forces it into the condenser $G^2$, where the moisture is removed in the manner already described, and thence through the heater G and hot-air pipes, as before. If the return-pipe $g'$ is employed, there is no need of the ventilator $m$ on top of the tower. The return-pipe $g'$ may, however, be omitted, and also the connected pipe $g^2$, and the moisture-laden air be carried from the tower by a ventilator $m$, and fresh outside air will be taken in by the fan $G'$. The advantage of returning the air is the saving of the heat it may contain.

The octagonal form of the building approaches a square toward the top. Ventilating-pipes $k'$ lead from the outside hot-air chamber $H^2$ up into the tower B, to facilitate the escape of moisture-laden air while heating up the mass of wood when the heat is first started and to prevent collapsing of the return-pipe by creating a vacuum before the air becomes heated and forced through the mass of wood. These ventilating-pipes have weighted hinged covers $k^2$, which are kept closed except when opened for the purposes mentioned. The weight is so adjusted that if a vacuum is created in the tower the covers will open and admit the air from below.

Preferably the walls of the crib flare outwardly from top to bottom, as shown, but they may be made to flare from the bottom toward the top, which I have previously referred to as "hopper" shaped, or they may be made vertical and still include the main features of my invention. Also, the heat-generator may be sufficiently protected by being inclosed in a metal case, so that it may be placed inside the kiln, and yet retain features of my invention; and where such features are applicable to such modified forms of construction or arrangement I intend that my claims shall cover the same.

Referring to Fig. 2, main steam-pipe $l$, leading from any source of steam supply, (not shown in the drawings,) has branches $l'$ leading into the hot-air pipes H and $H'$ and into the hot-air chambers. A single valve $l^2$ controls the passage of steam from the main steam-pipe and is ordinarily closed. In case of fire the valve is opened and steam is admitted through the branch pipes into the hot-air pipes and hot-air chambers and crib, quenching the fire.

The wood when dried is taken out of pockets $n$ at the bottom and bundled in presses attached to the bench $n'$.

The drying-crib, it will thus be seen, is entirely surrounded by close hot-air chambers, preferably lined with metal or other tight sheathing, and the hot air has no method of escape after being forced by the fan or otherwise into the hot-air chambers except by passing first through the mass of wood, and the closeness of the chambers also prevents any of the dust from accumulating on the steam-pipes which generate the heat in the heat-generator, if steam be used, as they are entirely outside the kiln and inclosed in a metal case, the steam-pipes $t'$, which admit steam for putting out fire, being ordinarily cold, as no steam is admitted except in emergencies.

Whatever dust may arise in the hot-air chamber will be forced by the strong pressure of the air into the mass of wood in the crib, and instead of rising again will settle down with the wood and be taken out at the bottom.

The wood is dried very evenly and gradually but quickly, and perfectly green wood can be dried suitable for kindlings in from four to six days. So far as I am aware I am the first to construct a hot-air crib for drying kindlings that is entirely surrounded with hot-air chambers lined with metal or other material, the hot air having no escape from the chambers except through the mass of wood to be dried.

What I claim as my invention is—

1. In a drying-kiln for wood, an open-work crib which holds the wood, a hot-air chamber inside of the crib and a hot-air chamber outside of the crib, a source of hot-air supply, a pipe leading from said source of supply and around the crib in the outside hot-air chambers, outlet-openings in said pipe for the hot air, a pipe leading from the hot-air supply into the inner hot-air chamber, an outlet for the hot air in the upper part of the kiln, the chambers otherwise being tight so that the hot air will pass through the wood before it reaches the outlet, substantially as described.

2. In a drying-kiln for wood, an open-work crib for the wood, a hot-air chamber inside of the crib and a hot-air chamber outside of the crib, a source of hot-air supply outside of the kiln, a pipe leading from said source of supply into the outside hot-air chamber and surrounding the crib, outlet-openings in said pipe for the hot air, a pipe leading from the hot-air supply to the inner hot-air chamber, means by which the hot air is forced under pressure through the pipes into the hot-air chambers and through the wood, an outlet for the hot air in the upper part of the kiln, the chambers being otherwise tight so that the hot air will pass through the wood before reaching the outlet, substantially as described.

3. In a drying-kiln, a crib surrounded by a hot-air chamber, a pipe leading from a source of hot-air supply under pressure into said chamber and surrounding the crib, said pipe having a plurality of exit-openings and deflectors which direct the currents of hot air out of the pipe into the chamber and toward the crib, substantially as described.

4. In a drying-kiln, a crib surrounded by a hot-air chamber, a pipe leading from a source of hot-air supply under pressure into said chamber and surrounding the crib, said pipe being of gradually-decreasing diameter in that portion which surrounds the crib and having a plurality of exit-openings in its surface in different parts of the chamber, substantially as described.

5. In a drying-kiln, a crib having a central hot-air chamber with open-work sides which form inner walls for the crib, a centrally-pointed cap surmounting said chamber, the outer walls of the crib also having open-work flaring sides, a hot-air chamber surrounding the outer walls of the crib, a hot-air generator outside of the kiln, hot-air conductors leading into the lower part of said hot-air chambers, means by which the hot air is forced under pressure into the hot-air chambers and through the mass of wood in the crib and an outlet for the hot air after it has passed through the wood, substantially as described.

6. In a drying-kiln, a crib having a central hot-air chamber with flaring open-work sides, a centrally-pointed cap surmounting said chamber, the outer walls of the crib also having open-work flaring sides, a hot-air chamber surrounding the crib, a hot-air generator outside of the chambers and crib, hot-air conductors leading into the lower part of said chambers, means by which the hot air is forced under pressure into the hot-air chambers and through the wood in the crib, a return-pipe which conveys the air back to the bottom of the kiln, a condenser and means by which the said return air is forced into and through the condenser and hot-air generator and again into the hot-air chambers of the kiln, substantially as described.

7. In a drying-kiln a crib having open-work sides, a central air-chamber within the crib, an air-chamber surrounding the crib, a hot-air generator outside of the kiln, with pipes which convey the hot air into said chambers, and openings in the pipes for the distribution of the hot air in the chambers, means by which the hot air is forced through the hot-air pipes into the chambers under pressure, an outside steam supply and a main steam-pipe having branches which lead into the hot-air pipes, a single valve in the main steam-pipe outside of the kiln controlling the admission of steam into the several branches whereby steam may be quickly admitted to the hot-air pipes and chambers and interior of the crib, substantially as described.

8. In a hot-air drying-kiln, a crib having open-work sides, hot-air chambers inside and outside of the crib, the hot air having ordinarily no escape except through the mass of wood in the crib, and ventilating-passages with dampers which can be opened to allow an extra avenue of escape for the damp air, substantially as described.

OTIS H. SMITH.

Witnesses:
 H. M. HOWLAND,
 WILLIAM A. COPELAND.